United States Patent Office 3,313,563
Patented Apr. 11, 1967

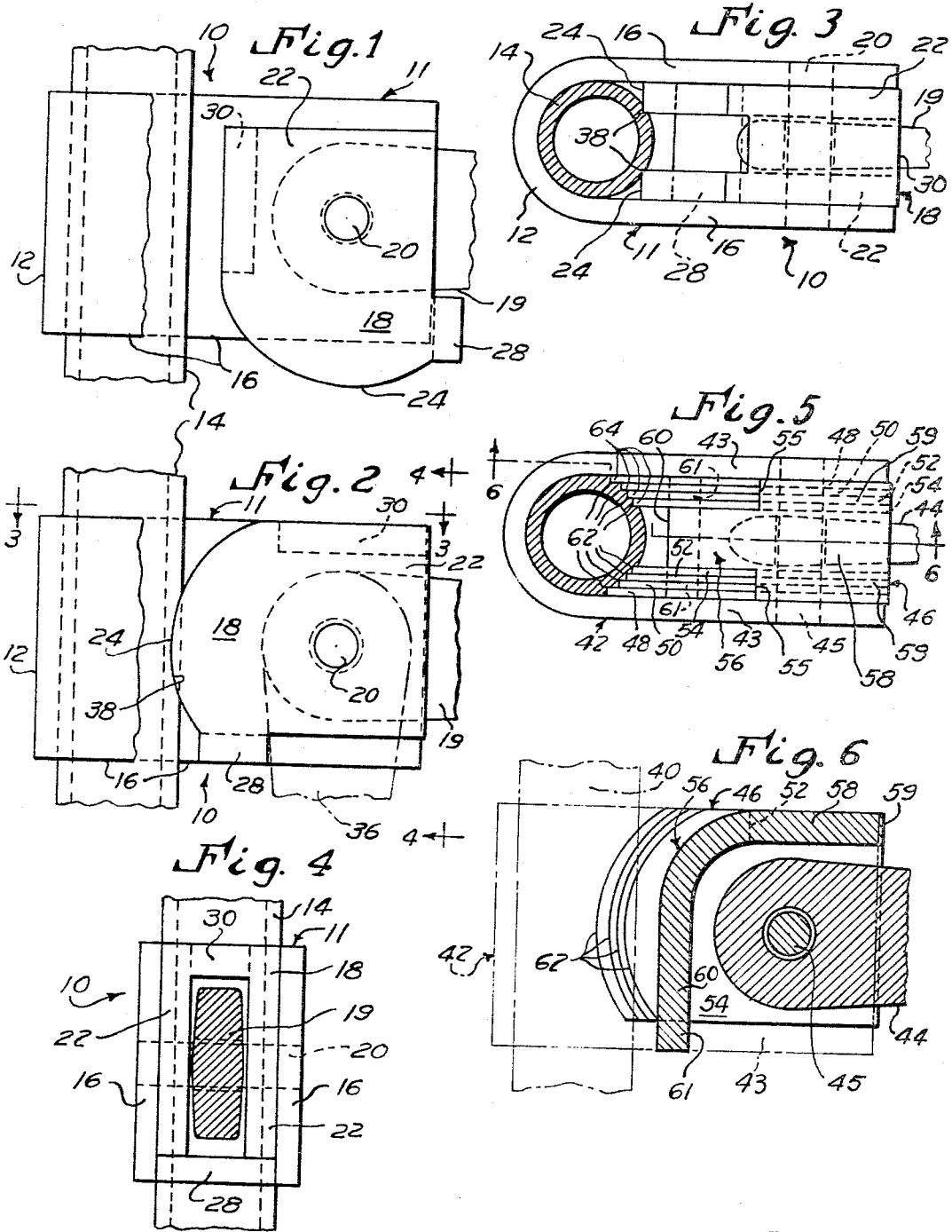

3,313,563
ADJUSTABLE LEVER MOUNT
John E. Hallberg, Hammond, Ind., assignor to W. H. Miner, Inc., Chicago, Ill., a corporation of Delaware
Filed Aug. 4, 1965, Ser. No. 477,113
12 Claims. (Cl. 292—1)

This invention relates in general to door fasteners for freight conveyances or containers and more particularly to a vertically and radially adjustable handle or lever mount for operating the door fastener of a truck trailer or the like.

Door fasteners for the cargo doors of truck trailers, freight cars, or other containers are usually comprised of an elongated vertically arranged tube or bar rotatably mounted on the door. The bar carries cams or fingers attached to its ends, and same are rotated by the bar either into engagement with keepers or disengagement therefrom to either latch or unlatch the door. A handle is provided on the bar for easily rotating the bar and fingers, however, since the height of the door and consequently the location of the bar is subject to considerable variance, it is desirable that the position of the handle be adjustable axially and radially on the bar. This renders the handle easily accessible to an operator standing at ground level, for example.

The handle is usually pivotally carried by a handle or lever mount which is connected to the bar, and the handle may simply depend or hang from the mount when the door is unlatched. When the door is to be latched, the handle is moved into a horizontal position and, together with the mount, same is rotated to latch the door. As the fingers engage the keepers, the handle simultaneously engages a seal plate carried by the door, thereby holding same in a latched position.

The present invention takes advantage of the pivotal movement of the handle in its mount to facilitate the axial and radial adjustment of the mount and proper alignment of the handle with the seal plate, whereby the handle will engage the seal plate simultaneously with engagement of the fingers with the keepers. Thus, the lever mount, when in its loosened condition, is slidable and rotatable on the bar. A lever cam is mounted coaxially with the handle on the lever mount and is adapted to be rotated by the handle for locking the mount in rigid material deforming engagement with the bar after the mount has been adjusted to a desired position and, likewise, to operate the coaxial cam for disengagement from the bar to free the mount from the bar and thereby permit further adjustment. Thus, the lever mount carrying the handle is movable vertically along the bar and when same is in the desired position, the handle is simply rotated into a depending position to force the lever cam into locking engagement with the bar. Thereafter, the handle may be rotated into the horizontal position and then rotated about the axis of the bar to rotate the bar and thus latch the door and engage the handle with the seal plate. If the handle fails to properly engage its seal plate, it is simply rotated upwardly to free the lever cam and thereby the lever mount from engagement with the bar, allowing further axial or radial adjustment of the mount and handle. In addition, the lever mount and lever cam are adapted to be rotated into positions on either side of the bar thereby permitting the seal plate to be alternatively located on either side of the bar for engaging the handle, thereby contributing to the versatility of the arrangement.

It is therefore one object of the present invention to provide an improved arrangement for adjusting the radial and axial positions of a door fastener handle on the usual rotary bar of a door fastener arrangement used on truck trailers, crago containers, and the like.

It is another object of the present invention to provide a more economical handle adjustment arrangement for a freight conveyance or container door fastener.

It is another object of the present invention to provide an improved arrangement for permitting axial and radial adjustment of the door fastener handle used for latching the door of a freight conveyance or container.

It is still another object of the present invention to provide a simplified arrangement for permitting the door fastener handle of a freight conveyance to engage a seal plate on either side of the locking bar.

Other objects of the present invention will become apparent on examination of the following specification and claims together with the drawings, wherein:

FIG. 1 is a side elevational view of one form of an adjustable lever mount embodying the invention with the mount disengaged from the locking bar and with parts of the rotary locking bar, the U-shaped member and the handle being broken away;

FIG. 2 is a side elevational view similar to FIG. 1 with the mount disposed in locking engagement with the locking bar;

FIG. 3 is a horizontal section taken generally on the line 3—3 of FIG. 2;

FIG. 4 is a vertical section taken generally on the line 4—4 of FIG. 2;

FIG. 5 is a top elevational view of another embodiment of the lever mount of the invention; and FIG. 6 is a vertical section taken generally on the line 6—6 of FIG. 5.

In FIGS. 1-4 a lever mount which is adjustably attachable to a rotary locking bar of a conventional freight conveyance or container door fastener assembly is illustrated by the reference character 10 and is comprised of a U-shaped member 11 having a generally semi-circular rear leg portion 12 adapted to partially encircle an elongated rotary locking bar 14. The lever mount 10 is adapted to be slid vertically or axially along the bar 14 or rotated radially about same into any desired angular position. The U-shaped member 11 also includes spaced apart side legs 16 which extend away from the bar 14 and between which a lever cam 18 and a handle 19 are coaxially mounted for rotation or pivotal movement about a pin 20.

The bar 14 is an elongated tube rotatably mounted on the freight conveyance door and carrying conventional cam ends or latching fingers (not shown) at opposite ends for rotation into engagement with the conventional keepers (not shown) located on the conveyance body for latching the door.

The lever cam 18 is comprised of a pair of spaced apart plates or legs 22 through which the pin 20 is received. The legs 22 have arcuate end cam faces 24 as seen at the lower end of the leg 22 in FIG. 1. The inner edges of the cam faces 24 are adapted to rigidly engage the bar 14 by biting into same and displacing or deforming some of the material thereof, as seen in FIG. 2, upon pivotal movement of the lever cam 18 since the radial distance from the axis of pin 20 to portions of the cam faces 24 exceeds the distance between the axis of the pin 20 and the nearest point on the periphery of the bar 14. The legs 22 are connected along their bottom edges adjacent the faces 24 by a transversely extending brace member 28 which is adapted to be engaged by the handle 19 when the handle 19 is pivoted downwardly from its position shown in FIG. 1 whereby to pivot the cam 18 into its bar locking position shown in FIG. 2. Another transversely extending brace member 30 connects the two legs 22 along their upper edges at the corners thereof opposite the brace member 28 and is adapted for engagement by the handle 19 during release of the lever mount 10 from the bar 14.

The assembly of the lever mount 10 to the bar 14 is performed in a conventional manner before the bar is rotatably mounted on the cargo space or freight container door. The handle 19 will normally tend to depend angularly from the pin 20 under the influence of gravity after the bar 14 is mounted on the door. The handle 19, therefore, is lifted or pivoted upwardly, thus engaging the brace member 30 and pivoting the lever cam 18 into the position shown in FIG. 1, whereafter, the handle 19 may be held horizontal while the lever mount 10 is slid vertically or axially along the bar 14 to a desired height and rotated to either side of bar 14 depending on which side of the bar the conventional seal plate (not shown) is located.

The handle 19 is now pivoted downwardly to engage the brace member 28 and thus pivot the lever cam 18 in the same direction. The handle 19 is pivoted to a position generally shown by broken lines 36 in FIG. 2, to bring the arcuate cam faces 24 of cam 18 into a generally vertical position. As the cam faces 24 move into material deforming engagement with the bar 14, the rear leg portion 12 of the U-shaped member 11 is drawn into tight engagement with the bar 14, while the edges of the cam faces 24 deform the surface of the bar to form arcuate depressions 38 therein for holding the lever mount 10 rigidly connected to the bar 14.

The handle 19 may remain in its depending position while the door is open or unlatched. When it is desired to latch the door, the handle 19 is moved upward into its horizontal position and then rotated, thus rotating the lever mount 10 and the bar 14 to engage the conventional bar ends with the conventional keepers. The handle 19 should then engage the conventional seal plate carried by the door. If the handle 19 does not properly engage the seal plate, same is pivoted upwardly to engage the brace member 30 and force the cam faces 24 out of engagement with the bar 14. The lever mount 10 may then be radially adjusted about the bar 14 after which the handle 19 is pivoted downwardly to again force the cam faces 24 into biting engagement with the bar 14. When the door is now latched, the handle engages the seal plate in the proper manner.

From the foregoing discussion it will be apparent that the lever cam 18 may be reversibly mounted on the pin 20 to accomplish the same result. In the case of the reversible mounting the brace member 28 will face upwardly while the brace member 30 will be at the lower side of the lever cam. To engage the lever cam faces 24 with the bar 14, the handle 19 is pivoted upwardly to a position generally parallel to the bar 14. The brace member 28 may thereafter be conveniently struck one or more blows with a hammer for additionally wedging the cam faces 24 into the bar 14. Release of the lever mount from the bar may, of course, be simply accomplished by pivoting the handle 19 in a downward direction to engage brace member 30 and force the lever cam upwardly out of engagement with the bar.

Another embodiment of the invention is illustrated in FIGS. 5 and 6. In this modification the elongated rotary bar is indicated by reference character 40, and same is engaged by a U-shaped member 42 similar to the member 11 of FIGS. 1–4. A handle 44, together with a lever cam 46, is pivotally mounted on a pin 45 between side legs 43 of the U-shaped member 42.

The lever cam 46 is comprised of two series of plates 48, 50, 52 and 54 pivotally supported on the pin 45 and retained in spaced apart relationship by a generally L-shaped strap 56 having a horizontal leg 58 and a depending vertical leg 60 as best shown in FIG. 6. The plates 48–54 are each of a different length and are each provided with an arcuate end cam edge 62 for engagement with the bar 40. The cam edges 62 are spaced apart whereby same form a series of progressive steps which, when engaged with the bar 40, form a series of separate arcuate depressions 64 in the bar 40. The depressions 64 extend over a considerable area of the bar to increase the biting grip and thus the rigidity of the connection. The end of the horizontal leg 58 of the L-shaped strap 56 is provided with outwardly projecting flange portions 59 which extend across the upper edges of corner notches 55 cut in the plates 48–54 and the lower end of the vertical leg 60 is provided with outwardly projecting flange portions 61 which extend across the bottom edges of the plates 48–54 whereby to rigidify the lever cam 46.

The adjustment of the embodiment of the invention shown in FIGS. 5 and 6 is similar to that described for the arrangement shown in FIGS. 1–4. Pivotal movement of the handle 44 upwardly engages the horizontal leg 58 of the strap 56 and forces the plate cam edges 62 out of engagement with the bar 40, thereby allowing the lever mount to be moved axially along the bar to a desired position and to be adjusted radially about the bar 40 to permit the handle 44 to properly engage the conventional seal plate. Pivotal movement of the handle 44 downwardly engages same with the leg 60 of the strap 56 to pivot the lever cam 46 and bring the cam edges 62 into rigid biting engagement with the bar 40, whereafter the handle 44 may be pivoted to a horizontal position for rotating the bar and latching the door, as shown in FIG. 6.

The foregoing description pertains to an improved arrangement for adjustably mounting a handle on a rotary locking bar of a freight conveyance door locking mechanism, and the scope of its inventive concept is set forth in the accompanying claims.

What is claimed as new is:

1. An adjustable lever mount for use on a rotary locking bar of a cargo door latch mechanism, comprising, in combination, a U-shaped member adapted to embrace one side of said rotary locking bar, a cam member pivotably mounted on said U-shaped member and adapted to be rotated into tight gripping engagement with the opposite side of said locking bar, and a lever handle pivotably mounted on said U-shaped member and arranged to pivot said cam member into gripping engagement with said locking bar and then for rotating said rotary locking bar to actuate said latch mechanism.

2. An adjustable lever mount as recited in claim 1 wherein said cam member is characterized by spaced cams having arcuate edges adapted for biting engagement with said rotary bar to provide said tight gripping engagement therewith.

3. An adjustable lever mount as recited in claim 2 wherein a pair of brace members extend transversely between said cams each of which brace members is selectively engageable by said lever handle upon pivoting movement thereof in opposite directions to pivot said cam member so as to either engage said arcuate edges with said bar or disengage same from said bar.

4. An adjustable lever mount as recited in claim 1 wherein said cam member and said lever handle are mounted concentrically on said U-shaped member.

5. In a freight conveyance door fastener of the type having an elongated rotatable locking bar for use in latching the door, the improvement comprising an adjustable lever mount characterized by a U-shaped member adapted to partially encircle said bar and to be adjustably movable along and about the axis of said bar, a lever handle pivotably mounted on said U-shaped member, a lever cam pivotably carried on said U-shaped member and having an arcuate cam face including portions spaced a greater distance from the axis of rotation thereof than the distance between said axis and said bar, and means enabling said lever handle, when pivoted, to pivot said lever cam in either of two directions, whereby said arcuate cam face is selectively adapted to be either rigidly engaged with said bar for holding said U-shaped member in a desired position with respect to said bar or to be disengaged from said bar to permit the position of said U-shaped member to be adjusted with respect to said bar.

6. In a freight container door fastener assembly of the type having an elongated rotatable locking bar for use in latching the door, an adjustable lever mount comprising, a U-shaped member adapted to encircle a portion of said bar for movement along and about the axis of said bar and having a pair of side legs extending away from said bar, a lever handle pivotably mounted between said side legs of said U-shaped member about an axis perpendicular to the axis of said bar, a lever cam having spaced arcuate cam faces coaxially mounted with said lever handle for pivotal movement between said legs of said U-shaped member, and means on said cam enabling said lever handle, upon pivoting movement thereof, to pivot said arcuate cam faces into rigid engagement with the periphery of said bar as a result of deformation of the material of said bar, whereafter said handle is adapted to rotate said bar.

7. The lever mount recited in claim 6 in which said means on said cam comprises a first transversely extending brace member adapted to be engaged by said lever handle upon pivoting movement thereof in one direction for engaging said cam faces with said bar and a second transversely extending brace member adapted to be engaged by said lever handle upon pivoting movement thereof in the opposite direction for disengaging said cam faces from said bar.

8. The lever mount recited in claim 6 in which said bar is of circular cross section and said lever cam comprises a series of arcuate cam faces each disposed at progressively greater distances from the axis of rotation of said cam whereby each cam face engages a different portion of the periphery of said bar.

9. In a freight container door fastener arrangement of the type having an elongated rotatable locking bar carrying end fingers engageable with respective keepers upon rotation of said bar for latching the freight container door, the improvement comprising, a U-shaped lever mount partially encircling said bar and having side legs projecting away from said bar, said mount being movable along the axis of said bar and radially about the axis of said bar whereby said lever mount can be located at a desired height with said side legs projecting in a desired angular direction, a lever handle pivotably mounted between said side legs of said lever mount, a lever cam having arcuate cam faces mounted for pivotal movement coaxially with said lever handle between said side legs of said mount, first means on said cam adapted to be engaged by said lever handle upon pivotal movement thereof in one direction for pivoting said lever cam so as to bring said arcuate cam faces into material-deforming engagement with said bar whereby to rigidly connect said lever mount to said bar and thus permit rotation of said bar by said lever handle for either latching or unlatching said door, and second means on said cam adapted to be engaged by said lever handle upon pivotal movement thereof in the opposite direction for disengaging said cam faces from said bar to permit adjustment of said mount on said bar.

10. The improvement in a door fastener arrangement recited in claim 9 in which said arcuate cam faces are formed on spaced-apart plates and wherein said first and second means comprise transversely extending brace members interconnecting said plates.

11. The improvement in a door fastener arrangement recited in claim 9 characterized by a stepped series of arcuate cam faces being located at different distances from the axis of rotation of said cam whereby same deformingly engage different portions of the periphery of said locking bar.

12. In a freight container door fastener arrangement of the type having an elongated rotatable locking bar carrying end fingers engageable with respective keepers upon rotation of said bar to latch the freight container door, an adjustable lever mount assembly comprising, a U-shaped member partially encircling said bar and having a pair of side legs projecting away from said bar, a lever handle pivotably mounted between said side legs of said U-shaped member, a pair of spaced apart plates having arcuate cam faces mounted coaxially with said handle for pivotal movement between the side legs of said U-shaped member with each plate being disposed adjacent one of said side legs, a first transversely extending brace member interconnecting said plates and adapted to be engaged by said lever handle when said lever handle is pivoted in one direction whereby to pivot said arcuate cam faces of said plates into material-deforming engagement with said bar, thus rigidly connecting said lever mount assembly to said bar and permitting said bar to be rotated by said lever handle to either latch or unlatch said door, and a second transverse brace member interconnecting said plates and adapted to be engaged by said lever handle when said lever handle is rotated in the opposite direction for disengaging said arcuate cam faces from said bar to permit axial and radial adjustment of said lever mount assembly on said locking bar.

References Cited by the Examiner

UNITED STATES PATENTS

| | | |
|---|---|---|
| 672,380 | 4/1901 | Larzelere. |
| 1,919,328 | 7/1933 | Hansen _____ 292—218 |
| 2,770,479 | 11/1956 | Hilber _____ 287—58 X |

FOREIGN PATENTS

| | | |
|---|---|---|
| 35,390 | 8/1913 | Sweden. |
| 63,937 | 10/1927 | Sweden. |

EDWARD C. ALLEN, *Primary Examiner.*

RICHARD E. MOORE, *Examiner.*